Jan. 2, 1945. A. BOYNTON 2,366,175
REMOTELY CONTROLLED FLOW VALVE
Filed Dec. 6, 1941 2 Sheets-Sheet 1
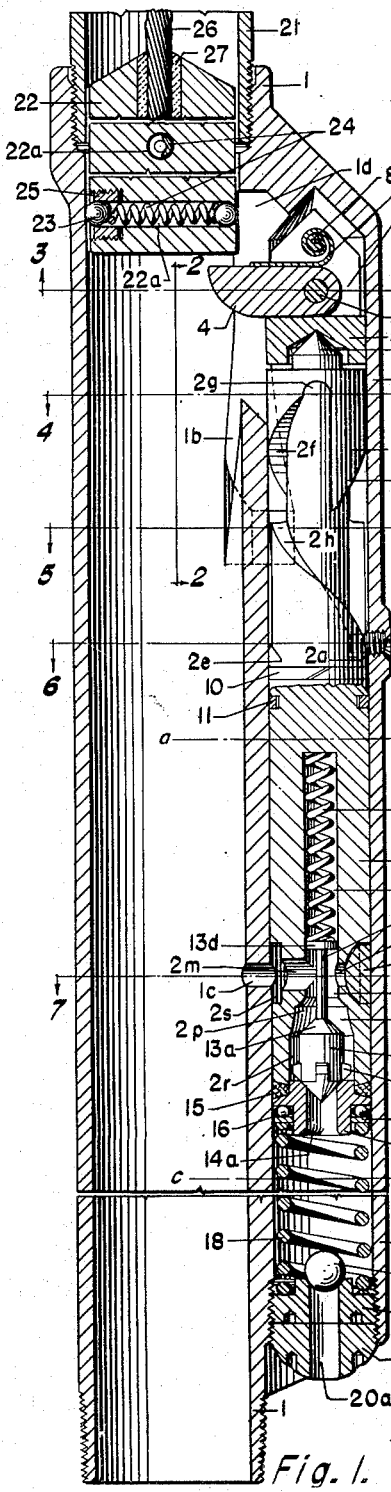
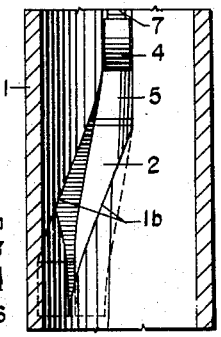
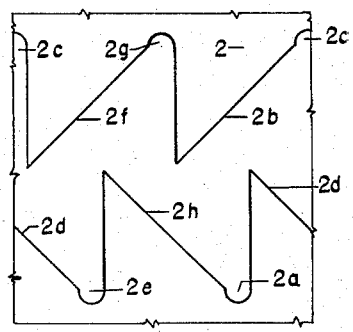
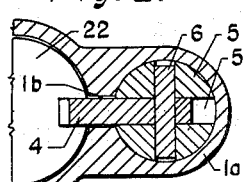
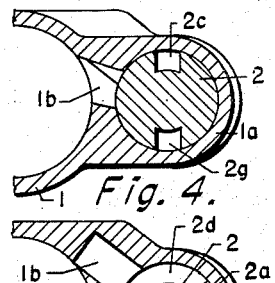
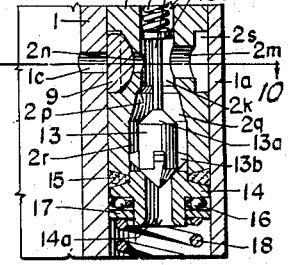
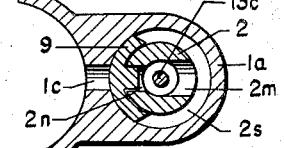
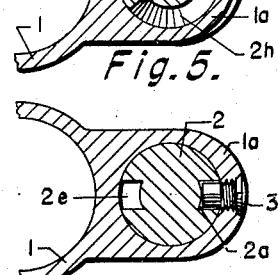
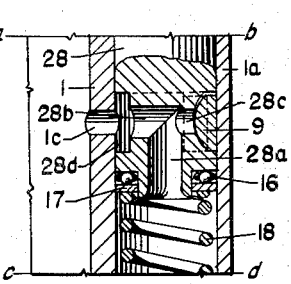
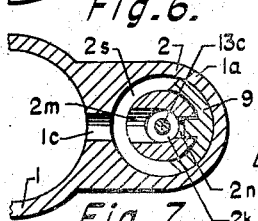
ALEXANDER BOYNTON, INVENTOR,
BY John T. Robertson
ATTORNEY.

Jan. 2, 1945.  A. BOYNTON  2,366,175
REMOTELY CONTROLLED FLOW VALVE
Filed Dec. 6, 1941   2 Sheets-Sheet 2
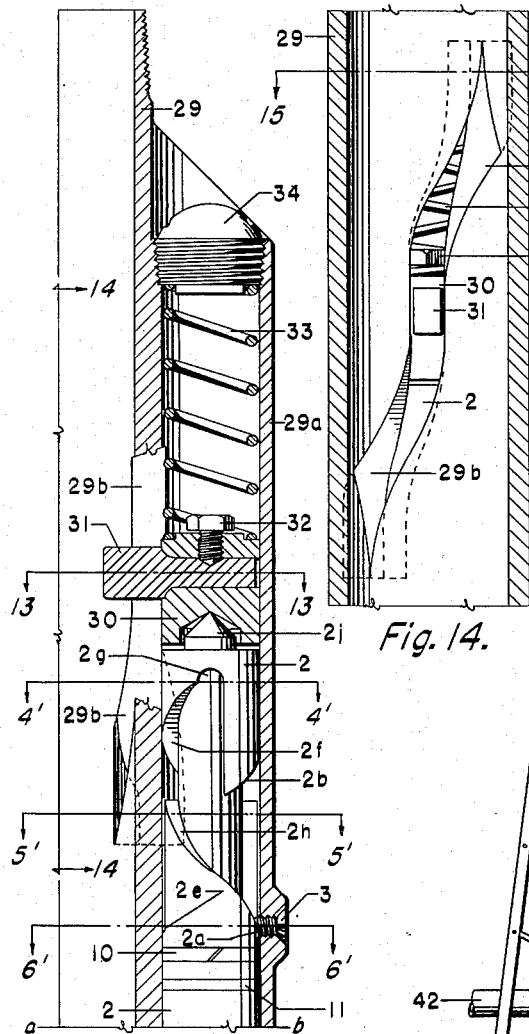
Fig. 12.
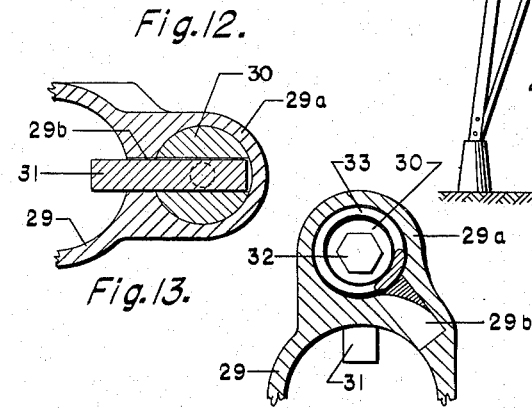
Fig. 13.  Fig. 15.
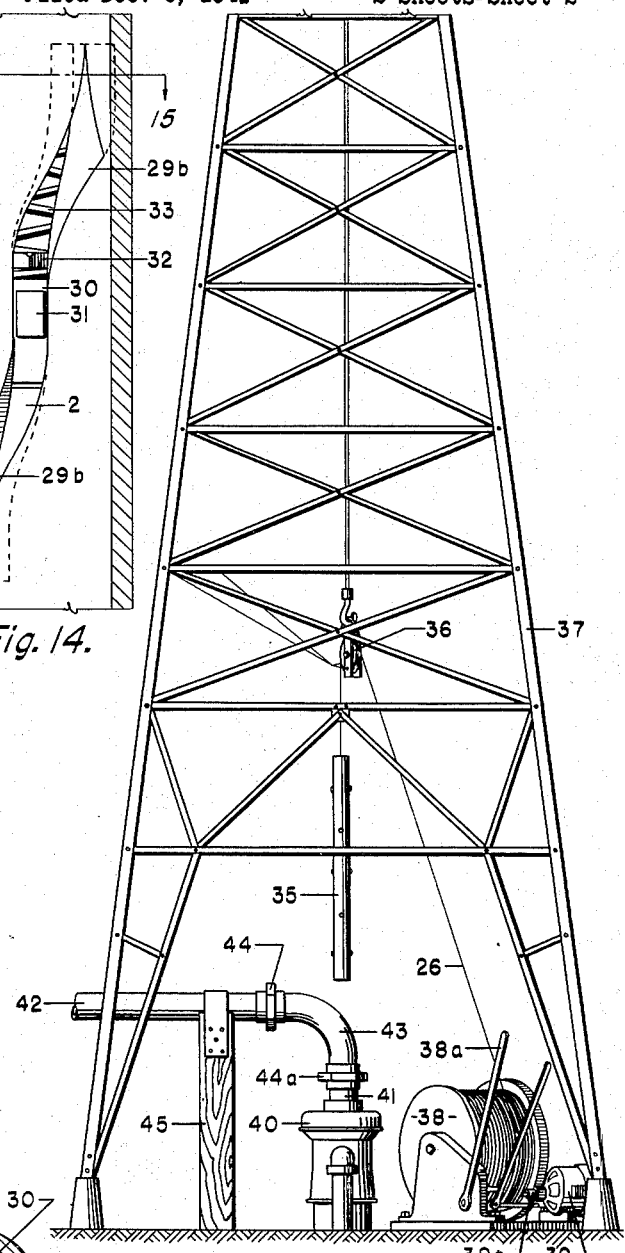
Fig. 14.
Fig. 16.
ALEXANDER BOYNTON,
INVENTOR.
BY John A. Robertson
ATTORNEY.

Patented Jan. 2, 1945

2,366,175

UNITED STATES PATENT OFFICE 2,366,175

REMOTELY CONTROLLED FLOW VALVE

Alexander Boynton, San Antonio, Tex.; Sida S. Martin, executrix of said Alexander Boynton, deceased Application December 6, 1941, Serial No. 421,937

24 Claims. (Cl. 103—233)

My invention relates to remotely controlled valves, particularly as a means for flowing wells, especially oil wells, and deals with the general subject of my copending applications Serial Numbers 421,934, 421,935, and 421,936 filed Dec. 6, 1941.

The principal object is to provide a flow valve that can be opened or closed selectively by means of a tool on a cable operated from the ground surface and which may be removed from the well in order to leave the flow tubing unobstructed.

Another object is to provide a series of valve controlled spaced openings in the tubing of a well, a selective one of said valves being open while the others are closed selectively.

Another object is to improve the ordinary automatic opening and the frequently uncertain closing of the now generally used automatic flow valves by substituting therefor a manually and remotely controlled valve opening and closing means of positive action.

Another object is to provide a flow device especially adapted to deep wells because of its positive operation due to freedom from control by differential force, resulting in tubing withdrawals being seldom necessary.

Another object is to provide a remotely controlled flow valve which does not restrict the tubing passage.

A further object is to provide a series of flow valves having the advantages set out in the foregoing objects and which, in addition thereto, can be quickly and inexpensively adapted for flowing a well through the casing, instead of through the tubing.

Other related objects are to provide remote controls for valves in cooling plants, ventilating systems, pipe lines, refineries, mines, production testing devices, well cementing equipment, and all other valves requiring remote control, including means of discharging liquids and gases at predetermined locations in warfare. The latter is particularly indicated when the desirability of having an operator remain at a safe distance and open valves to release poison gas is considered.

I attain the foregoing objects by means of an actuator in a lateral shell upon a nipple adapted to be connected into the eduction tubing of a well. The actuator has a series of external slots, pockets, and helically inclined cam surfaces adapted to impart rotary movement to it by contacting a stationary pin in the shell during longitudinal movements of the actuator which movements are caused by a weight lowered into the tubing on a cable and by an actuator spring adapted to reciprocate the actuator after the weight has been removed therefrom. The weight is engageable with a pin in the actuator; whereby the actuator will open or close a valve adapted to control the flow of pressure fluid into the tubing. The pin moves in a spiral slot and is forced out of the way of the weight when the valve is actuated thereby. This pin then folds to allow the weight to be withdrawn, as will appear more fully in the following specification and the accompanying drawings, in which—

Fig. 1 is mainly a longitudinal section through the device in the open position of the valve, a portion of the actuator being shown in outside view.

Fig. 2 is a longitudinal section on the line 2—2, Fig. 1.

Fig. 3 is a cross section on the line 3—3, Fig. 1.
Fig. 4 is a cross section on the line 4—4, Fig. 1.
Fig. 5 is a cross section on the line 5—5, Fig. 1.
Fig. 6 is a cross section on the line 6—6, Fig. 1.
Fig. 7 is a cross section on the line 7—7, Fig. 1.

Fig. 8 is a diagram of the pin pockets and inclined surfaces of the actuator.

Fig. 9 is a partial longitudinal section of the device in Fig. 1 showing the valve closed.

Fig. 10 is a cross section on the line 10—10, Fig. 9.

Fig. 11 is a partial longitudinal section illustrating a modified construction which may be employed between the line a—b and c—d in Fig. 1 to replace the construction shown there.

Fig. 12 is a partial longitudinal section through another modified construction, Fig. 1 below the line a—b being employed to complete this device.

Fig. 13 is a cross section on the line 13—13, Fig. 12.

Fig. 14 is a longitudinal section on the line 14—14, Fig. 12.

Fig. 15 is a cross section on the line 15—15, Fig. 14.

Fig. 16 is a typical installation plan of the surface equipment.

Similar characters of reference are employed to designate similar parts throughout the several views.

The nipple 1, having the one-way helical actuator pin slot 1b, the pin shuttle pocket 1d, and the pressure fluid inlet port 1c, may be cast of steel integrally with its lateral shell 1a within the polished bore of which the actuator 2 is slidable. The guide pin 3, secured in the shell 1a, extends into the open or cut-away portion of the actuator and causes it to describe 180 degrees' rotation each time it is forced downward and upward the length of this cut-away portion. Such movement of the actuator opens or closes the inlet port 1c by placing the segment valve 9 over it to close it or by placing the side port 2m in registration with it when it is open.

The end ring 20 and the spring adjusting ring 19, both having the central opening 20a, are engaged within the shell 1a. The latter ring supports the actuator spring 18, having its upper end engaged under the washer 17 contacting the thrust bearing 16 which transmits the force of this spring to the annular flange of the plunger support 14. This flange is formed into a gland which compresses the packing 15 against the lower end of the actuator.

Within the lower portion of the actuator are formed the differential spring chamber 2k', the metering chamber 2q, the plunger chamber 2r, the closure seat 2p, the lateral pressure port 2n, and the side port 2m leading into the annular recess 2s.

The plunger support 14, having the axial opening 14a, extends slightly into the plunger chamber and supports the plunger which has its lower end formed into a valve normally engaged upon a seat formed around the upper end of the opening 14a, by slight force of the differential spring 12 within the chamber 2k'. The plunger 13, having its upper end formed into the closure valve 13a adapted to engage the seat 2p formed around the upper end of the metering chamber 2q, has a relatively small rod-like axial extension 13c formed at its upper end into the plate-like enlargement 13d which supports the spring 12 slightly above the side port 2m. This enlargement is slidable in the pressure fluid passage 2k.

The plunger 13 has enough annular clearance around it within the chamber 2r to admit the proper volume of pressure fluid to flow the well. This plunger, which will seal off by engaging its valve 13a upon the seat 2p during high differentials, has the guide fins 13b slidable within the chamber 2r. These fins and the enlargement 13d will guide the plunger to travel centrally within the chambers 2r and 2q and to engage centrally upon the seat 2p. The plunger has its lower end formed into a valve adapted to engage a seat upon its support member 14, in order to prevent well liquid from draining out of the tubing during intervals between flowing operations. The check valve 19a upon the spring adjusting ring 19 serves the same purpose.

The actuator pin housing 5 is slidable within the smooth bore of the shell 1a. The upper end of this housing has the slot 5a within which the actuator pin 4 is secured by the hinge pin 6 engaged within the slotted end of the housing. The spring support pin 8, also secured through the slotted end of the housing, and in spaced relation to the actuator pin 4, has engaged through it and wrapped around it the spiral spring 7 which is adapted to resiliently urge the actuator pin 4 to the horizontal position; whereby the latter pin is engaged longitudinally upon the flat surface at the lower end of the slot 5a of the pin housing 5. In that position, the pin 4 is adapted to be forced downward in the helical slot 1b and to force downward with it the actuator 2.

If the pin 4 be forced downward by the weight or tool 22 as the weight is lowered into the tubing 21, the walls of the helical slot 1b, best shown in Fig. 2, will guide this pin completely out of the longitudinal flow passage through the nipple 1, as appears by the position of this slot in Fig. 5. When the weight is withdrawn, the spring 7 will yield and allow the actuator pin 4 to turn upon the pin 6 and enter the shuttle pocket 1d which is a vertical enlargement of the helical slot 1b, and thus become completely removed from the axial flow passage through the tubing 21.

The actuator 2 has its axially pointed upper end 2j engaged with the actuator pin housing 5. This one point contact above the actuator and the thrust bearing 16 below it provide that the actuator may be rotated independently of the actuator spring 18 and the actuator pin housing 5, which latter member also is adapted to turn slightly, due to the rotational influence of the spiral slot 1b upon the pin 4.

The curved segment valve 9 (see Fig. 7), having its outer surface conforming to the bore through the shell 1a, is received within the annular recess 2s around the actuator 2. This valve has a radial extension received within a slot in the actuator communicating with the lateral pressure port 2n. This key-like extension causes the valve to turn with the actuator. Pressure fluid force acting through the pressure port 2n will cause the valve to move into close contact with the polished inner surface of the bore through the shell 1a and close the pressure fluid inlet port 1c when the valve is over that port, as appears in Fig. 9.

The piston rings 10 and 11, received within annular recesses around the actuator 2, and the packing 15 are for the obvious purpose of preventing pressure fluid from leaking along the periphery of the actuator.

The actuator assembly is adapted to become stationary in two positions. One of these positions is when the guide pin 3 is engaged within the lower pin pocket 2a, this being the open position of the device as in Fig. 1. The other stationary position of the actuator is when the pin 3 is engaged in the other lower pin pocket 2e, the valve being closed then, as in Fig. 9. The actuator spring 18 constantly urges the actuator upward to one of these position.

It will be observed in Fig. 8 that the upper pin pockets and helically inclined cam surfaces are rotatably offset with relation to the lower pin pockets and helically inclined cam surfaces; that is, the lower pin pocket 2a is opposed by the upper helically inclined cam surface 2b; the lower pin pocket 2e is opposed by the upper helically inclined cam surface 2f; the upper pin pocket 2c is opposed by the lower helically inclined cam surface 2d; and the upper pin pocket 2g is opposed by the lower helically inclined cam surface 2h.

The upper inclined cam surfaces 2b and 2f and the lower inclined cam surfaces 2d, and 2h alternately contact the guide pin 3 as the actuator is moved upward and downward; thereby rotating it 180 degrees at the completion of each combined upward and downward movement, as will be explained further under operation.

While I have shown the pin pockets 2a, 2e, 2c, and 2g in the actuator, it will be understood that the same are unnecessary and may be omitted, these pockets being shown merely as a matter of nicety in finishing the actuator.

The modified construction illustrated in Fig. 11 between the cross lines a—b and c—d is adapted to replace the structure shown in Fig. 1 between the lines a—b and c—d, the remainder of the modified construction being the same as in Fig. 1.

It will be observed that this modification omits the differential valve mechanism appearing in the preferred embodiment.

The piston 28, having the central opening 28a, the side port 28b, the lateral pressure port 28c, and the annular recess 28d, is so similar in its relation to the inlet port 1c and the segment valve 9 as to be the manifest equivalent of the similar construction in Fig. 1, minus the plunger, differential spring, and plunger support, the packing 15 in Fig. 1 being omitted as unnecessary in Fig. 11.

Subsurface installation

By way of illustrating the best presently known mode of applying the invention, the devices illustrated in Figs. 1, 11, and 12 may be installed in the eduction tubing of wells at intervals which, for example, may vary from 300 to 500 feet. Obviously, well conditions will control the number of devices which should be employed in any series, three to five devices ordinarily being satisfactory.

Operation of Figs. 1 and 11

The valve operating movements of the actuator are partially longitudinal and partially rotational, both occurring simultaneously. The path of pressure fluid entering the device illustrated in Fig. 1 will be via the central opening 20a, the axial opening 14a, the plunger chamber 2r, the meter chamber 2q, the pressure fluid passage 2k, the side port 2m, the annular recess 2s, and the pressure fluid inlet port 1c, in the order named. Pressure fluid likewise will enter the modified device partially illustrated in Fig. 11, via the central opening 20a (Fig. 1), the central opening 28a, the side port 28b, the annular recess 28d, and the inlet port 1c.

The differential spring 12, Fig. 1, should be of such force as to allow the plunger to close the path of pressure fluid through the device whenever there may be insufficient well liquid above the open device, as will be well understood by those skilled in the art.

The operating tool employed for Figs. 1 and 11 in this invention consists of the weight or tool 22 secured upon the cable 26 by the lead, solder, or babbitt 27, as appears in Fig. 1 where the tool is shown in the tubing, it being understood that the weight is employed only during valve changing operations and that it will be withdrawn from the tubing while the well is being flowed. The balls 23 protrude slightly in order to guide the tool centrally of the tubing 21. A restriction at one end of each of the cross bores 22a restrains each of the balls from escaping. The stop ring 25 secured in the other end of each of these cross bores likewise restrains the other balls, the pair of balls in each cross bore being resiliently urged to protrude outwardly of the weight 22 by the spring 24.

To change any device from the open to the closed position or from the closed to the open position, pass the tool through it once and withdraw the tool from the well.

Any device being open with the guide pin 3 in the lower pocket 2a, as in Fig. 1, when the weight 22 forces the actuator pin 4 downward in the one-way helical slot 1b, the upper inclined cam surface 2b will turn the actuator until the upper pocket 2c will contain the guide pin at which time the pin 4 will be entirely out of the tubing passage, as is apparent by the position of the lower portion of this slot in Fig. 5; whereupon the actuator spring 18 will force the actuator upward and cause the lower inclined cam surface 2d to rotate the actuator further until the lower pocket 2e will contain the guide pin. Then the valve 9 will close the port 1c, as in Fig. 9.

The device being closed with the guide pin 3 in the lower pocket 2e, as in Fig. 9, when the weight 22 forces the actuator pin 4 downward in the one-way helical slot 1b, the upper inclined cam surface 2f will turn the actuator until the upper pocket 2g will contain the pin, at which time the pin 4 will be again entirely out of the tubing passage, as becomes apparent by noting the position of the helical slot 1b in Fig. 5; whereupon the spring 18 will force the actuator upward again and cause the lower inclined cam surface 2h to rotate the actuator further until the lower pocket 2a will contain the pin 3. The valve 9 then will uncover the port 1c and be in the open position, as in Fig. 1.

It will be assumed, for example, that in a series of devices in a well it is desired to close the upper device and open the next lower one. To do this, lower the weight 22 through the second device and withdraw the weight from the tubing. The first device will be closed and the second device will be opened by movements which have been described.

During the withdrawal of the weight through the devices, it is apparent that the actuator pin 4 will be turned upward, deflecting the spring 7 until the inner end of the pin will be within the shuttle pocket 1d and entirely outside of the tubing passage, thereby permitting the weight to pass upward.

As is apparent, both constructions may be modified for casing flow, by closing the opening 20a and providing another opening through the nipple 1 between the lower end of the actuator assembly and the ring 19 and moving the inlet port 1c to the opposite side of the shell 1a. The construction illustrated in Fig. 11 may be modified likewise for casing flow by merely closing the opening 20a (see Fig. 1) and providing another opening through the shell 1a on the opposite side thereof from the port 1c.

The modified and equally preferred construction illustrated in Figs. 12 through 15 will be understood as being the same as in Fig. 1 where the parts bear the same reference characters as in Fig. 1. Fig. 12 will be considered as being completed by the structure illustrated in Fig. 1 below the line a—b, both structures being identical from that line downward.

Fig. 12 differs mainly from Fig. 1 in that the actuator pin 31 is not hinged like the pin 4 in Fig. 1 but is adapted to be moved upward and downward with its housing 30 to disappear from the passage through the nipple 29 and into the two-way helical slot 29b at both extremities of the actuator travel. This pin has a head extending into the tubing passage and slidable in the two-way helical slot 29b wherein it becomes removed from the tubing passage at both ends of the slot in the same manner as the pin 4 in Fig. 1 is removed from that passage at the lower end of its travel by disappearing into the one-way helical slot 1b. The position of the upper end of the two-way helical slot 29b may be observed in Fig. 15. The position of the lower end of this slot is shown at 1b in Fig. 5, the head of the actuator pin 31 being wholly removed from the tubing passage at each end of the slot.

The sections 4'—4', 5'—5', and 6'—6' in Fig. 12 will be understood as being similar to the unprimed sections identified by the same reference numerals in Fig. 1.

The nipple 29, which is adapted to be connected into the tubing string of a well, has the lateral shell 29a within which the actuator 2 and the actuator pin housing 30 are slidable. The actuator pin housing 30 has a cross bore within which the actuator pin 31 is secured by the set screw 32.

The coiled return spring 33, which should be somewhat weaker than the spring 18 in Fig. 1, normally urges the pin housing 30 to engage the upper end of the actuator 2. The plug 34 is employed to hermetically close the upper end of the shell 29a and to confine the return spring 33. Manifestly the spring 33 may be omitted and gravity force relied upon to return the housing.

Operation of Fig. 12

The operation of the construction illustrated in Fig. 12 will be the same as was described for Figs. 1 and 11, except that the weight or tool 35 has its upper end flat and at right angles to the axis in order to engage the head of the pin 31, so as to raise the pin without being shunted to the opposite side of the tubing passage, as would result if the upper end of the weight were tapered like the weight 22 in Fig. 1.

As the weight or tool 35 (see Fig. 16) is lowered past the device, the actuator 2 will be forced downward as in Fig. 1. When the weight is being withdrawn past the device illustrated in Fig. 12, the actuator pin 31 will be contacted by it and be forced upward out of the tubing passage and into the two-way helical slot 29b, at which time the return spring 33 will be compressed. As soon as the weight passes the pin, this spring will return the pin and its housing 30 to the position shown in Fig. 12.

In Fig. 16, illustrating a typical aboveground installation, I show the operating weight or tool 35 suspended over the well tubing 41 upon the cable 26 supported by the pulley 36 hanging from the derrick 37. The reel 38, having the brake 38a, is operated by the motor 39 having the clutch 39a. The reel and motor may be positioned at any convenient place near the casing head 40 for the purpose of opening or closing the devices in the well.

In providing that the weight or tool 35 may be used quickly, the tubing 41 is connected to the flow line 42 by means of the long radius nipple 43 and the unions 44 and 44a. By disconnecting the union 44a and turning the nipple 43 out of the way, the weight or tool 35 may be lowered instantly into the well for manipulating the valves in a manner which has been described. The post 45 supporting the flow line 42 provides that the union 44a may be reconnected quickly.

A convenient and economical source of power for operating the weight or tool 35 may be provided by installing a generator in a car employed upon the oil lease.

Manifestly, the motor, reel, cable, and operating tool may be moved easily from one well to another in order to avoid unnecessary duplication.

It is understood that all references to positions and directions such as "upper" and "lower," "upward" and "downward," "above" and "below" apply to the device as illustrated in the accompanying drawings wherein the upper portion of the device is shown uppermost.

Manifestly, the details of construction and arrangement of parts are subject to many obvious variations and minor changes without departing from the scope and purpose of my invention as stated in the objects and as defined by the appended claims.

I claim:

1. In a remotely controlled flow device: a nipple adapted to be connected into a string of tubing; a lateral shell on said nipple, said nipple and shell having adjoining walls formed with a helical slot and a pressure fluid inlet port therein; an actuator slidable in said shell, said actuator having a plunger chamber, a metering chamber, a pressure fluid passage, a closure seat between said passage and metering chamber, a differential spring chamber, a side port, a pressure port, an annular recess, and a peripheral opening forming two upper helically inclined cam surfaces, two lower helically inclined cam surfaces, said upper cam surfaces sloping in one direction, said lower cam surfaces sloping in reverse direction from the upper and being rotationally offset relative thereto, and pin pockets between said upper and lower cam surfaces; an actuator pin housing free upon one end of said actuator and slidable in said shell, said housing being formed with a slot; an actuator pin rockably secured in said slot; a spring normally urging said pin to extend yieldably in one direction through said helical slot; a plunger support upon the other end of said actuator; a spring adjusting ring in said shell; a check valve on said support; an actuator spring urging said actuator toward said actuator pin housing; a plunger in said plunger chamber; a closure valve on said plunger, said valve being in spaced relation to said closure seat and adapted to engage the same to close said passage; a segment valve in said annular recess; and a guide pin in said shell, said pin being adapted to rotate said actuator by engaging upon said inclined cam surfaces and within said pockets when the actuator is reciprocated so as to place said side port and said pressure fluid inlet port in communication in one position of said actuator and to close said inlet port by said segment valve in the other position of said actuator.

2. In a remotely controlled flow device: a nipple adapted to be connected into a string of tubing; a lateral shell on said nipple, said nipple and shell having adjoining walls formed with a helical slot and a pressure fluid inlet port therein; an actuator slidable in said shell, said actuator having a peripheral opening forming upper and lower rotatably offset helically inclined cam surfaces adapted to be engaged by a guide pin to rotate said actuator a predetermined portion of its circumference when the same is reciprocated; an actuator pin housing free upon said actuator and also slidable in said shell; an actuator pin in said housing, said pin extending through said helical slot and being yieldable in one direction, said spring urging said actuator to engage said housing; a member carried by said shell providing a passage for pressure fluid through a portion of said shell and a portion of said actuator, said passage communicating with said inlet port in one position of said actuator; a valve upon said actuator, said valve being adapted to close said inlet port in another position of said actuator; a spring loaded differential valve in said passage, said valve being adapted to close same during high differentials and to open same during low differentials; a check valve in said passage; and a guide pin in said shell, said pin being coefficient with said inclined cam surfaces to alternately open and close said inlet port as said actuator is reciprocated.

3. In a remotely controlled flow device: a nipple adapted to be connected into a string of tubing; a lateral shell on said nipple, said nipple and shell having adjoining walls formed with a helical slot and a pressure fluid inlet port therein; an actuator slidable in said shell, said actuator having offset peripheral inclined cam surfaces; an actuator pin housing also slidable in said shell; an actuator pin yieldably secured in said housing and extending through said helical slot; an actuator spring urging said actuator to engage said housing; a member carried by said shell providing a passage for pressure fluid through a portion of said shell and actuator, said passage being adapted to register with said inlet port in one position of said actuator; a valve on said actuator, said valve being adapted to close said inlet port in another position of said actuator; a differential valve in said passage; a guide pin in said shell and coefficient with said inclined cam surfaces to produce partial rotation of said actuator as the same is reciprocated to alternately open and close said inlet port; and means movable in the tubing and shell and including a remotely controlled weight to reciprocate said actuator.

4. In a remotely controlled flow device: a nipple adapted to be connected into a string of tubing and having an inlet port; a lateral shell on said nipple, said nipple and shell having adjoining walls formed with a helical slot therein; an actuator in said shell and having inclined offset cam surfaces; a guide pin in said shell, said pin being coefficient with said cam surfaces to cause partial rotation of said actuator as the same is reciprocated; a member carried by said shell providing a passage for pressure fluid, said passage communicating with said inlet port; a differential valve always in said passage and adapted to close it at a predetermined differential in one direction; a a check valve always in said passage and adapted to close it at slight differential in the same direction and at all differentials in the opposite direction; another valve alternately in and out of said passage and operable by said actuator to alternately open and close said passage when said actuator is reciprocated; and means movable in the tubing and shell for reciprocating said actuator.

5. In a remotely controlled flow device: a nipple adapted to be connected into a string of tubing and having an inlet port; a lateral shell on said nipple, said nipple and shell having adjoining walls formed with a helical slot therein; an actuator in said shell and having inclined offset cam surfaces; a guide pin in said shell, said pin being coefficient with said cam surfaces to cause partial rotation of said actuator as the same is reciprocated; a member carried by said shell and providing a passage for pressure fluid, said passage communicating with said inlet port; a differential valve in said passage and adapted to close it at a predetermined differential in one direction; another valve upon and operable by said actuator to alternately open and close said passage when said actuator is reciprocated; and means movable in the tubing and shell for reciprocating said actuator.

6. In a remotely controlled flow device: a nipple adapted to be connected into a string of tubing; a lateral shell on said nipple, said nipple and shell having adjoining walls formed with a helical slot and a pressure fluid inlet port therein; an actuator slidable in said shell, said actuator having a peripheral opening forming upper and lower rotatably offset helically inclined cam surfaces adapted to be engaged by a guide pin to rotate said actuator a predetermined portion of its circumference when the same is reciprocated; an actuator pin housing free upon said actuator and also slidable in said shell; an actuator spring in said shell; an actuator pin in said housing, said pin extending through said helical slot and being yieldable in one direction, said spring urging said actuator to engage said housing; a member carried by said shell and providing a passage for pressure fluid through a portion of said shell and a portion of said actuator, said passage communicating with said inlet port in one position of said actuator; a valve upon said actuator, said valve being adapted to close said inlet port in another position of said actuator; a check valve in said passage; and a guide pin in said shell, said pin being coefficient with said inclined cam surfaces to alternately open and close said inlet port as said actuator is reciprocated.

7. In a remotely controlled flow device: a nipple adapted to be connected into a string of tubing and having an inlet port; a lateral shell on said nipple, said nipple and shell having adjoining walls formed with a helical slot therein; an actuator in said shell and having inclined offset cam surfaces; a guide pin in said shell, said pin being coefficient with said cam surfaces to cause partial rotation of said actuator as the same is reciprocated; a member carried by said shell and providing a passage for pressure fluid, said passage communicating with said inlet port; a valve operable by said actuator to alternately close said passage when said actuator is reciprocated; an actuator pin housing slidable in said shell; and an actuator pin firmly secured in said housing, said pin extending through said helical slot.

8. In a remotely controlled flow device: a nipple adapted to be connected into a string of tubing and having an inlet port; a shell on said nipple, said nipple and shell having adjoining walls formed with a helical slot therein; an actuator slidable in said shell; two upper and two lower peripheral helically inclined cam surfaces on said actuator, said upper cam surfaces sloping in one direction, said lower cam surfaces sloping in the reverse direction and being rotationally offset relative to said upper cam surfaces; an actuator pin housing also slidable in said shell; an actuator pin secured in said housing and being adapted to move in said helical slot to disappear into both extremities thereof; a member carried by said shell and providing a passage for pressure fluid through a portion of said actuator, said passage communicating with said inlet port; a differential valve in said passage and adapted to close it at a predetermined differential in one position of said actuator; a segment valve on said actuator, said segment valve being adapted to close said passage in another position of said actuator; a guide pin in said shell, said pin being coefficient with said inclined cam surfaces to cause partial rotation of said actuator and open and close said segment valve in different positions of said actuator; an actuator spring urging said actuator toward said housing; a weaker return spring urging said housing toward said actuator; and a remotely controlled weight movable in the tubing and shell adapted to force said actuator pin to disappear into said helical slot in two directions while said actuator is moved in one direction by said weight and in the other direction by said actuator spring to alternately open and close said passage.

9. In a remotely controlled flow device: a nipple adapted to be connected into a string of tubing and having an inlet port; a lateral shell on said nipple, said nipple and shell having adjoining walls formed with a helical slot therein; an actuator in said shell and having inclined offset cam surfaces; a guide pin in said shell, said pin being coefficient with said cam surfaces to cause partial rotation of said actuator as the same is reciprocated; a member carried by said shell and providing a passage for pressure fluid, said passage communicating with said inlet port; a valve operable by said actuator to alternately close said passage when said actuator is reciprocated; an actuator pin housing slidable in said shell; an actuator pin firmly secured in said housing, said pin extending through said helical slot; and two springs of different strengths in said shell, the stronger of said springs urging said actuator toward said housing.

10. In a remotely controlled flow device: a nipple having an inlet port; a shell on said nipple, said nipple and shell having adjoining walls formed with a helical slot therein; an actuator and an actuator pin housing free upon each other, both being slidable in said shell, said actuator being formed with inclined cam surfaces and a passage communicating with said inlet port; two springs urging said actuator and housing in opposite directions; an actuator pin secured in said housing and extending through said helical slot; a valve in said passage and independent of said actuator whereby said valve is adapted to close said passage in all positions of said actuator; a valve on said actuator, said last valve being adapted to close said passage in only one position of said actuator; a guide pin in said shell, said pin being coefficient with said cam surfaces to rotate said actuator as the same is reciprocated to alternately open and close said valve on said actuator; and a remotely controlled weight movable in the nipple and adapted to engage said actuator pin for reciprocating said actuator.

11. In a remotely controlled flow device in a string of tubing: a nipple adapted to be connected into said tubing and having an inlet port; a lateral shell on said nipple, said nipple and shell having adjoining walls formed with a helical slot; an actuator having inclined cam surfaces and an actuator pin housing slidable in said shell; an actuator spring urging said actuator toward said housing; a guide pin in said shell and coefficient with the cam surfaces of said actuator to rotate said actuator as it is reciprocated; a member carried by said shell and providing a passage for pressure fluid through a portion of said actuator, said passage communicating with said inlet port; a valve in said passage and adapted to close it at a predetermined differential; a valve on said actuator and adapted to close said passage in one rotational position of said actuator; and an actuator pin in said housing, said pin extending through said helical slot, in combination with; a remotely movable and withdrawable weight movable in the tubing and nipple and coefficient with said spring and actuator pin to selectively open or close said valve on said actuator in said device.

12. In a remotely controlled flow device in a string of tubing: a nipple adapted to be connected into said tubing and having an inlet port; a lateral shell on said nipple, said nipple and shell having adjoining walls formed with a helical slot therein; an actuator having inclined cam surfaces and an actuator pin housing slidable in said shell; an actuator spring urging said actuator toward said housing; a guide pin in said shell and coefficient with the cam surfaces of said actuator to rotate said actuator as it is reciprocated; a member carried by said shell and providing a passage for pressure fluid through a portion of said actuator, said passage communicating with said inlet port; a valve on said actuator and adapted to close said passage in one rotational position of said actuator; and an actuator pin in said housing, said pin extending through said helical slot, in combination with; a remotely movable and withdrawable weight movable in the tubing and nipple and coefficient with said spring and actuator pin to selectively open or close said valve in said device.

13. In a remotely controlled flow device having a nipple and a shell thereon: an actuator pin housing formed with a slot and slidable in said shell; an actuator pin in said slot; a hinge pin extending through one end of said actuator pin and said housing; a spring support pin in said housing; a spring on said support pin, said spring being coefficient with said actuator pin to normally position same so that one end thereof will extend into said nipple; a valve; an actuator carrying said pin, said valve being connected to said actuator to be moved thereby, said nipple and said shell having a slot for effecting communication between the same, through which slot said actuator pin projects.

14. In a remotely controlled flow device having a nipple with a flow passage for fluid and a shell thereon: an actuator pin housing slidable in said shell; an actuator pin hingedly mounted in said housing, said pin extending into said flow passage; means to hold said pin in driving relation to said housing as said housing is moved in one direction by force transmitted through said pin; a valve; an actuator carrying said pin, said valve being connected to said actuator to be moved thereby, said nipple and said shell having a slot for effecting communication between the same, through which slot said actuator pin projects.

15. In a remotely controlled flow device: a nipple adapted to be connected into a string of tubing; a lateral shell on said nipple, said nipple and shell having adjoining walls formed with a pressure fluid inlet port and a helical slot communicating between the interiors of said nipple and shell; an actuator pin adapted to be positioned in one end of said helical slot and slide in one direction therein; means to move said pin out of said slot at the other end thereof; a valve; an actuator carrying said pin, said valve being connected to said actuator to be moved thereby, said nipple and said shell having a slot for effecting communication between the same, through which slot said actuator pin projects.

16. In a remotely controlled flow device: a nipple adapted to be connected into a string of tubing; a lateral shell on said nipple, said nipple and shell having adjoining walls formed with a pressure fluid inlet port and a helical slot communicating between the interiors of said nipple and shell; an actuator pin in said helical slot, said pin being adapted for reciprocatory movement therein; a valve; an actuator carrying said pin, said valve being connected to said actuator to be moved thereby, said nipple and said shell having a slot for effecting communication between the same, through which slot said actuator pin projects.

17. In a remotely controlled flow device: an actuator having a plunger chamber, a metering chamber communicating with said plunger chamber, a pressure fluid passage communicating with said metering chamber, a closure seat between said passage and metering chamber, a differential spring chamber, a side port communicating with said pressure fluid passage, a pressure port, an annular recess communicating with said side port, a peripheral opening forming two circularly arranged upper helically inclined cam surfaces, two circularly arranged lower helically inclined cam surfaces, said upper cam surfaces sloping in one direction, said lower cam surfaces sloping in reverse direction from the upper and being rotationally offset relative thereto, and pin pockets between said upper and lower cam surfaces.

18. In a remotely controlled flow device, the combination of: a nipple having a shell thereon and having an inlet port; an actuator longitudinally and rotatably slidable in said shell; a member carried by said shell and providing a passage communicating with said inlet port; and three valves adapted to control said passage, one said valve being a check, the second being a closure valve, and the third being a segment valve upon said actuator and adapted to close said passage in one of two positions assumable by said actuator.

19. In a remotely controlled flow device having a nipple and a shell thereon; an actuator pin housing formed with a slot and slidable in said shell; an actuator pin in said slot; a hinge pin extending through one end of said actuator pin and said housing; a spring support pin in said housing; and a spring on said support pin, said spring being coefficient with said actuator pin to normally position same so that one end thereof will extend into said nipple; a valve device; and means within said nipple and cooperatively connected with said actuator housing and said valve device for transmitting the sliding movement of said housing to said valve device.

20. In a remotely controlled flow device having a nipple with a flow passage for fluid and a shell thereon; an actuator pin housing slidable in said shell; an actuator pin hingedly mounted in said housing, said pin extending into said flow passage; and means to hold said pin in driving relation to said housing as said housing is moved in one direction by force transmitted through said pin; a valve device; and means within said nipple and cooperatively connected with said actuator housing and said valve device for transmitting the sliding movement of said housing to said valve device.

21. In a remotely controlled flow device wherein valve means are provided for controlling the flow of fluid in a string of tubing: means to operate the valve means, said valve-operating means including a nipple adapted for connection in the string of tubing, a lateral shell on said nipple, said nipple and said shell having adjoining walls formed with a pressure fluid inlet port and a helical slot communicating between the interiors of said nipple and shell, an actuator pin adapted to be positioned in one end of said helical slot and slide in one direction therein; and means to move said pin out of said slot at the other end thereof.

22. In a remotely controlled flow device; a nipple adapted to be connected into a string of tubing; a lateral shell on said nipple, said nipple and shell having adjoining walls formed with a pressure fluid inlet port and a helical slot communicating between the interiors of said nipple and shell; an actuator housing; an actuator pin carried by said housing and lying in said helical slot, said pin being adapted for reciprocating movement therein; a valve device; and means within said nipple and cooperatively connected with said actuator housing and said valve device for transmitting the sliding movement of said housing to said valve device.

23. In a remotely controlled flow device: an actuator having a plunger chamber, a metering chamber communicating with said plunger chamber, a pressure fluid passage communicating with said metering chamber, a closure seat between said passage and metering chamber, a differential spring chamber, a side port communicating with said pressure fluid passage, a pressure port communicating with said side port, an annular recess, a peripheral opening forming two circularly arranged upper helically inclined cam surfaces, two circularly arranged lower helically inclined cam surfaces, said upper cam surfaces sloping in one direction, said lower cam surfaces sloping in reverse direction from the upper and being rotationally offset relative thereto, and pin pockets between said upper and lower cam surfaces; flow valve means; and operative connections between said flow valve means and said actuator.

24. In a remotely controlled flow device, the combination of: a nipple having a shell thereon and having an inlet port; an actuator longitudinally and rotatably slidable in said shell; a member carried by said shell and providing a passage communicating with said inlet port; and three valves adapted to control said passage, one said valve being a check, the second being a closure valve, and the third being a segment valve upon said actuator and adapted to close said passage in one of two positions assumable by said actuator, said actuator having a plunger chamber, a metering chamber, a pressure fluid passage, a closure seat between said passage and metering chamber, a differential spring chamber, a side port, a pressure port, an annular recess, a peripheral opening forming two circularly arranged upper helically inclined cam surfaces, two circularly arranged lower helically inclined cam surfaces, said upper cam surfaces sloping in one direction, said lower cam surfaces sloping in reverse direction from the upper and being rotationally offset relative thereto, and pin pockets between said upper and lower cam surfaces.

ALEXANDER BOYNTON.